United States Patent
Sanada et al.

(10) Patent No.: US 10,676,603 B2
(45) Date of Patent: Jun. 9, 2020

(54) METHOD FOR PRODUCING RESIN COMPOSITION

(71) Applicant: The Japan Steel Works, LTD., Tokyo (JP)

(72) Inventors: Takashi Sanada, Ichihara (JP); Mitsuyoshi Shimano, Ichihara (JP); Koji Kameo, Ichihara (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 153 days.

(21) Appl. No.: 15/743,846

(22) PCT Filed: Jul. 13, 2016

(86) PCT No.: PCT/JP2016/070680
§ 371 (c)(1),
(2) Date: Jan. 11, 2018

(87) PCT Pub. No.: WO2017/010511
PCT Pub. Date: Jan. 19, 2017

(65) Prior Publication Data
US 2018/0201769 A1    Jul. 19, 2018

(30) Foreign Application Priority Data
Jul. 16, 2015 (JP) ................................ 2015-141894

(51) Int. Cl.
| | | |
|---|---|---|
| *C08L 23/12* | (2006.01) | |
| *B32B 7/00* | (2019.01) | |
| *C08L 23/08* | (2006.01) | |
| *C08L 23/20* | (2006.01) | |
| *B29B 7/84* | (2006.01) | |
| *B29B 7/90* | (2006.01) | |
| *B29B 7/74* | (2006.01) | |
| *B29B 7/60* | (2006.01) | |
| *B29B 7/00* | (2006.01) | |
| *B29B 7/48* | (2006.01) | |
| *B29B 7/46* | (2006.01) | |
| *B29K 23/00* | (2006.01) | |
| *B29K 509/00* | (2006.01) | |

(52) U.S. Cl.
CPC .............. *C08L 23/12* (2013.01); *B29B 7/007* (2013.01); *B29B 7/484* (2013.01); *B29B 7/60* (2013.01); *B29B 7/7495* (2013.01); *B29B 7/84* (2013.01); *B29B 7/90* (2013.01); *C08L 23/0815* (2013.01); *C08L 23/20* (2013.01); *B29B 7/46* (2013.01); *B29K 2023/12* (2013.01); *B29K 2509/00* (2013.01)

(58) Field of Classification Search
CPC .......... C08L 23/12; C08L 23/20; C08L 23/08; B29B 7/00; B29B 7/48; B29B 7/84; B29B 7/90
USPC ....................................................... 524/436
See application file for complete search history.

(56) References Cited

U.S. PATENT DOCUMENTS

| | | |
|---|---|---|
| 5,728,337 A | 3/1998 | Yoshikawa et al. |
| 2004/0005508 A1 | 1/2004 | Kimura et al. |
| 2008/0176999 A1 | 7/2008 | Tamai et al. |
| 2010/0010141 A1* | 1/2010 | Nakamura .............. C08L 67/02 524/451 |

FOREIGN PATENT DOCUMENTS

| | | |
|---|---|---|
| CN | 102596524 A | 7/2012 |
| JP | S58029644 A | 2/1983 |
| JP | H021650 A | 1/1990 |
| JP | H04185647 A | 7/1992 |
| JP | H05237914 A | 9/1993 |
| JP | H09029814 A | 2/1997 |
| JP | H10024483 A | 1/1998 |
| JP | H10180841 A | 7/1998 |
| JP | H10193343 A | 7/1998 |
| JP | H10244534 A | 9/1998 |
| JP | 2000246732 A | 9/2000 |
| JP | 2002187125 A | 7/2002 |
| JP | 2002220476 A | 8/2002 |
| JP | 2004027125 A | 1/2004 |
| JP | 3712185 B2 | 11/2005 |
| JP | 2007197695 A | 8/2007 |

(Continued)

OTHER PUBLICATIONS

Int'l Search Report dated Sep. 27, 2016 in Int'l Application No. PCT/JP2016/070680.
Int'l Preliminary Report on Patentability dated Jan. 16, 2018 in PCT/JP2016/070680.
Andersen et al., "Improving Twin-Screw Compounding of Reinforced Polyolefins," Plastics Technology, pp. 1-9 (2013).
Anonymous, "ZSK 101 Training Materials 2009," Coperion Cooperation US, pp. 1-505 (2009).
Dieterich et al., "Techniques and Options for Improved Twin-Screw Compounding of Filled Polyolefins," 29 pages (2014).
Extended European Seach Report dated Feb. 21, 2019 in EP Application No. 16824491.1.
Kracalik et al., "Advanced Compounding: Extrusion of Polypropylene Nanocomposites Using the Melt Pump," Journal of Applied Polymer Science, vol. 113, pp. 1422-1428 (2009).

(Continued)

Primary Examiner — Deve V Hall
(74) Attorney, Agent, or Firm — Panitch Schwarze Belisario & Nadel LLP

(57) ABSTRACT

A method for producing a resin composition is provided. The method includes melting and kneading a thermoplastic resin having a transition temperature of less than 200° C. and a powder with a twin-screw kneading extruder. The powder is an inorganic filler having an apparent density of 0.1 to 1.5 g/ml. The resin is supplied from a supply port to the extruder, and the powder is supplied from a gravimetric feeder to the extruder through a screw type side feeder. A transport capacity of the side feeder is 2 times or more an effective volume of the powder per unit time. In the extruder, melting and kneading are performed under conditions in which resin pressure in a first kneading zone is 1 MPa or more, and resin pressure in a second kneading zone is less than 3 MPa, and gas is removed from a vent port.

5 Claims, No Drawings

(56) References Cited

FOREIGN PATENT DOCUMENTS

| JP | 2009045804 A | 3/2009 |
|----|--------------|--------|
| JP | 2009280710 A | 12/2009 |
| JP | 2011255652 A | 12/2011 |
| WO | 2006123824 A1 | 11/2006 |

OTHER PUBLICATIONS

Martin, C., "Devolatization via Twin Screw Extrusion—Theroy, Tips and Test Results," Plastics Extrusion Asia, pp. 1-7 (2014).
Notice of Information Provision dated Aug. 7, 2018 in JP Application No. 2017528705.
Office Action dated Jan. 8, 2019 in JP Application No. 2017528705.
Office Action dated Mar. 27, 2019 in CN Application No. 201680041006.0.
Plastics Processing Technology Newsletter, Japan Steel Works, Ltd., 4 pages (2003).
Polymer Kneading and Dispersion Technology and Specific Causes of Defects and Countermeasures Therefor, Technical Information Institute Co., Ltd., 44 pages (2003).
Side Feeder with DGC, Distributed at International Plastic Fair by Japan Steel Works, 7 pages (2014).
Supplementary European Search Report dated Apr. 9, 2019 in EP Application 16824491.1.
Todd, D. B., "Mixing of Fillers with Plastics," Functional Fillers for Plastics, pp. 39-55 (2005).
Todd, D. B., "Improving Incorporation of Fillers in Plastic. A Special Report," Advances in Polymer Technology, vol. 19, No. 1, pp. 56-64 (2000).
Twin Screw Extruder Series TEX Application, Japan Steel Works, Ltd. Catalog excerpt, 27 pages (2014).
Xanthos, M., "Functional Fillers for Plastics—Google Books," XP055556533 (2010).

* cited by examiner

METHOD FOR PRODUCING RESIN COMPOSITION

CROSS-REFERENCE TO RELATED APPLICATION

This application is a Section 371 of International Application No. PCT/JP2016/070680, filed Jul. 13, 2016, which was published in the Japanese language on Jan. 19, 2017 under International Publication No. WO 2017/010511 A1, and claims priority under 35 U.S.C. § 119(b) to Japanese Application No. 2015-141894 filed Jul. 16, 2015, the disclosures of which are incorporated herein by reference in their entirety.

TECHNICAL FIELD

The present invention relates to a method for producing a resin composition, comprising melting and kneading a thermoplastic resin and a powder with a twin-screw kneading machine.

BACKGROUND ART

Resin compositions filled with powder reinforcement materials such as inorganic fillers overcome many problems of thermoplastic resins such as rigidity, heat resistance, and dimensional stability with the progress of technical development in recent years, and performance improvement is steadily promoted, and the resin compositions are widely used as industrial members typified by automobile parts. Resins in which the resins after polymerization are powdery and bulky like polyphenylene ether and polyphenylene sulfide are also compounded by kneading machines and utilized in various applications because of their excellent properties.

When a powder thermoplastic resin, or a powder raw material including a large amount of a powder reinforcement material, is melted and kneaded with an extruder, to produce a resin composition, such a powder raw material is poor in biting properties into the extruder because the apparent density is low compared with that of a raw material in a pellet form. Therefore, the output rate achieved is low, and there are many cases where the productivity is low.

For productivity improvement techniques for the method for melting and kneading a powder raw material, those like the following are known.

For example, in Patent Literature 1, a method for producing a resin composition with a twin-screw extruder in which screws having a configuration in which a single-thread screw having wide flight width and kneading disks having a particular twist angle are combined are housed in a barrel, for the purpose of improvement in the productivity of a resin composition containing a filler component at high concentration is described.

In Patent Literature 2, a method fix producing a resin composition with a twin-screw extruder comprising screws having a configuration in which a single-thread screw and particular kneading disks are combined, for the purpose of productivity improvement in the production of a resin composition using a powder raw material is described.

In Patent Literature 3, an extrusion method in which a synthetic resin is melted and kneaded with, for the purpose of an increase in the output rate during the extrusion of a synthetic resin material including a fine powder raw material or a fine powder in a large amount a twin-screw extruder in which an opening that discharges air contained in the above material is provided downstream from the material supply port of a barrel, and without providing such a pressure rise region as to apply strong compression between the material supply port and the opening is described.

In Patent Literature 4, a method for producing a resin composition, in which raw materials are melted and kneaded with a twin-screw kneading extruder under conditions in which the resin pressure in a plasticization region is 1 MPa, or less, for the purpose of improvement in the productivity of a resin composition containing a polypropylene-based resin and an inorganic filler is described.

In Patent Literature 5, a method for producing a resin composition including powdery polyphenylene ether and a thermoplastic resin other than the powdery polyphenylene ether, in which for the purpose of improvement in powdery polyphenylene ether transport capacity, powdery polyphenylene ether is supplied to a molten thermoplastic resin transport region from a side of a twin-screw extruder with a forced side feeder is described. In addition, it is described that in order to prevent a decrease in powdery polyphenylene ether transport capacity, it is preferable to provide an opening hole for gas venting on the upstream side of the upper cover of the extruder barrel at the site where the forced side feeder is connected, and perform gas venting from the opening hole.

However, in all the above production methods, the productivity improvement effect is not sufficient.

CITATION LIST

Patent Literature

Patent Literature 1: Japanese Unexamined Patent Publication No. H9-29814
Patent Literature 2: Japanese Unexamined Patent Publication No. H10-24483
Patent Literature 3: Japanese Unexamined Patent Publication No. 858-29644
Patent Literature 4: Japanese Unexamined Patent Publication No. 2002-187125
Patent Literature 5: Japanese Unexamined Publication No. 2011-255652

SUMMARY OF INVENTION

Technical Problem

Under such circumstances, it is an object of the present invention to provide a method for producing a resin composition, comprising melting and kneading a thermoplastic resin and a powder, in which the resin composition is produced stably with high productivity.

Solution to Problem

The present inventors have studied diligently and completed the present invention.

Specifically, the present invention relates to a method for producing a resin composition, comprising melting and kneading a thermoplastic resin having a transition temperature of less than 200° C. and a powder with a twin-screw kneading extruder, wherein the powder is one or more powders selected from the group consisting of an inorganic filler having an apparent density of 0.1 to 1.5 g/ml and a thermoplastic resin powder having an apparent density of 0.1 to 1.0 g/ml and a transition temperature of 200° C. or more, the twin-screw kneading extruder comprises a supply port, a first kneading zone, a screw type side feeder to which a gravimetric feeder is connected, a second kneading zone, and a vent port in order from an upstream side, the thermoplastic resin having a transition temperature of less than 200° C. is supplied from the supply port to the twin-screw kneading extruder, the powder is supplied from the gravimetric feeder to the twin-screw kneading extruder through the screw type side feeder, a transport capacity of the screw type side feeder is 2 times or more an effective volume of the powder supplied from the gravimetric feeder to the screw type side feeder per unit time, melting and kneading are performed under conditions in which resin pressure in the first kneading zone is 1 MPa or more, and resin pressure in the second kneading zone is less than 3 MPa, and gas is removed from the vent port.

Advantageous Effects of Invention

According to the present invention, a thermoplastic resin and a powder can be melted and kneaded to produce a resin composition stably with high productivity.

DESCRIPTION OF EMBODIMENTS

In the present invention, the transition temperature of a thermoplastic resin is, in the ease of a crystalline thermoplastic resin, the melting peak temperature of the resin, and, in the case of an amorphous thermoplastic resin, the glass transition temperature of the resin, and both are obtained by differential scanning calorimetry. More specifically, the above melting peak temperature means a temperature corresponding to the melting peak of a crystal measured by differential scanning calorimetry according to JIS K7122 and observed in the range of −50° C. or more and 200° C. or less. The above glass transition temperature means glass transition temperature measured by differential scanning calorimetry according to JIS K7121.

Examples of the thermoplastic resin having a transition temperature of less than 200° C. specifically include polyolefin-based resins (high density polyethylene, law density polyethylene, polypropylene, and the like), cyclic olefin-based resins, aliphatic polyester-based resins (polylactic acid and the like), aliphatic polycarbonates, polyoxymethylene (polyacetal and the like), and styrene-based resins (polystyrene, SEBS, and acrylonitrile-butadiene-styrene copolymers), and these may each be used alone, or a plurality of the resins may be combined. Further, for improvement in impact strength and providing flexibility, olefin-based, styrene-based, acrylic, urethane-based, or engineering plastic-based elastomers may be added. The transition temperature of the thermoplastic resin is preferably 190° C. or less and preferably 0° C. or more, preferably 30° C. or more. The state of the thermoplastic resin when it is supplied to a twin-screw kneading extruder is not particularly limited, and, for example, a pellet form, a granular form, or a powdery form can be adopted.

In the present invention, the powder melted and kneaded with the above thermoplastic resin having a transition temperature of less than 200° C. can be an inorganic filler having an apparent density of 0.1 to 1.5 g/ml, and examples of such an inorganic filler specifically include particulate fillers such as natural silicic acid or natural silicates such as talc, kaolinite, clay, pyrophyllite, sericite, bentonite, and silica, carbonates such as calcium carbonate, magnesium carbonate, and hydrotalcite, hydroxides such as aluminum hydroxide and magnesium hydroxide, oxides such as flowers of zinc, iron oxide, magnesium oxide, aluminum oxide, titanium oxide, and mullite, and synthetic silicic acid or synthetic silicates such as hydrous silicic acid and silicic anhydride, flaky fillers such as mica, fibrous fillers such as basic magnesium sulfate whiskers, calcium titanate whiskers, potassium titanate whiskers, aluminum borate whiskers, wollastonite, sepiolite, zeolite, attapulgite, xonotlite, rock wool, and glass wool, and amorphous carbon fillers such as carbon black, mesoporous carbon, and activated carbon. For the apparent density of the inorganic filler, 0.1 to 1.0 g/ml are preferable, and 0.1 to 0.8 g/ml are more preferable. Among inorganic fillers having an apparent density of 0.1 to 1.5 g/ml, inorganic fillers in Which the (apparent density)/(true density) is 0.3 or less are preferable in that the productivity improvement effect of the production method of the present invention is more significantly seen. In this application, the apparent density of the powder is apparent density measured by the method of JIS K7365: 1999. The true density is density calculated from a volume in which a clearance portion is excluded from the volume of a container having a fixed capacity when the container is filled with the powder, and in this application, the true density of the powder refers to density measured by the method of JIS 28807: 2012.

In the present invention, the powder melted and kneaded with the above thermoplastic resin having a transition temperature of less than 200° C. can be a thermoplastic resin powder having an apparent density of 0.1 to 1.0 g/ml and a transition temperature of 200° C. or more. Examples of such a thermoplastic resin powder specifically include polyphenylene ether, polyphenylene sulfide, polyetherketone, polyamide-based resins (nylon 6, nylon 66, and the like), aromatic polyester-based resins (polyethylene terephthalate, polybutylene terephthalate, polybutylene naphthalate, and the like), aromatic polycarbonates, and liquid crystalline polymers. Examples of those in which the effect of the present invention is high among these include polyphenylene ether, polyphenylene sulfide, and liquid crystalline polymers in which the melting point and the glass transition temperature are high and which do not reach a molten and flowing state, and maintain powder fluidity, until relatively high temperature. The transition temperature of the thermoplastic resin constituting the thermoplastic resin powder is 200° C. or more, preferably 210° C. or more, and preferably 450° C. or less, more preferably 400° C. or less.

When the total weight of the above thermoplastic resin having a transition temperature of less than 200° C. and the above powder is set at 100% by weight, a preferable range of the amount of the powder is 5 to 80% by weight, more preferably 10 to 70% by weight, and further preferably 15 to 60% by weight.

The twin-screw kneading extruder of the present invention comprises a supply port, a first kneading zone, a screw type side feeder to which a gravimetric feeder is connected, a second kneading zone, and a vent port in order from the upstream side. The above supply port is located in the most upstream portion of the twin-screw kneading extruder. It is preferable that a gravimetric feeder be connected to the above supply port.

The thermoplastic resin having a transition temperature of less than 200° C. is supplied from the above supply port to the twin-screw kneading extruder, and kneaded and sufficiently melted in the first kneading zone under a condition in which the resin pressure is 1 MPa or more. When a gravimetric feeder is connected to the above supply port, the thermoplastic resin having a transition temperature of less than 200° C. is supplied from the gravimetric feeder to the twin-screw kneading extruder through the above supply port. The resin pressure in the first kneading zone is preferably 2 MPa or more. The resin pressure in the first kneading zone is usually 10 MPa or less, preferably 8 MPa or less.

For the screws of the twin-screw kneading extruder according to the present invention, screws having 2-lobe kneading segments are preferable from the viewpoint of increasing productivity. Examples of the method for setting the resin pressure in the first kneading zone at 1 MPa or more include a method of suitably disposing, on the downstream sides in the first kneading zones of the screws of the twin-screw kneading extruder, such segments as to push back the resin in the upstream direction by the rotation of the screws, and segments having the effect of stemming the resin. Examples of the such segments as to push back the resin in the upstream direction by the rotation of the screws include reverse flights and disks generally referred to as reverse kneading disks in which the helix angle is more than 90° to the feed direction (hereinafter referred to as "reverse disks") Examples of the segments having the effect of stemming the resin include seal rings. By disposing, on the upstream sides in the first kneading zones of the screws, the so-called forward kneading disks in which the helix angle is less than 90° to the feed direction (hereinafter referred to as "forward disks"), melting can be performed while the resin pressure is efficiently raised. The so-called orthogonal disks in which the helix angle is 90° can be further disposed in the first kneading zones of the screws as required. It is preferable that the positions where the orthogonal disks are disposed be between the above-described reverse disks and forward disks or between the forward disks and the forward disks. The pressure in the kneading zone of the twin-screw kneading extruder can be measured by a pressure sensor by installing this sensor in the kneading zone of the cylinder.

The powder is supplied in a predetermined amount from the gravimetric feeder to the screw type side feeder and further supplied from the screw type side feeder to the twin-screw kneading extruder. The transport capacity of the screw type side feeder at this time is 2 times or more the effective volume of the powder supplied from the gravimetric feeder to the screw type side feeder per unit time. The transport capacity of the screw type side feeder is the volume of the powder supplied from the screw type side feeder to the twin-screw kneading extruder per unit time, and this can be obtained as the product of space volume fed forward while the screw of the screw type side feeder makes one revolution and the number of revolutions of the screw, or the product of the difference between the volume of the cylinder barrel per lead length of the screw of the screw type side feeder and the volume of the screw per lead length of the screw type side feeder and the number of revolutions of the screw of the screw type side feeder. The effective volume of the powder must be evaluated by the volume in the place where the powder is actually supplied to the side feeder. The powder is measured by the gravimetric feeder connected to the upper portion of the screw type side feeder, and supplied to the screw type side feeder by free fall. The effective volume of the powder supplied from the gravimetric feeder to the screw type side feeder per unit time is obtained as a value obtained by dividing the weight of the powder supplied from the gravimetric, feeder to the screw type side feeder per unit time by the apparent density of the powder. The apparent density of the powder used for the calculation of the effective volume in this application is a value obtained by dropping the powder into a measuring container such as a graduated cylinder from the same height as when the powder is actually supplied from the gravimetric feeder to the screw type side feeder, and dividing the weight of the powder in the measuring container by the volume of the powder measured by the measuring container. The transport capacity of the screw type side feeder depends on the specifications of the apparatus but is preferably 2 times or more the effective volume of the powder supplied from the gravimetric feeder to the screw type side feeder per unit time, preferably 4 times or more, and preferably less than 10 times, more preferably less than 8 times.

When the powder is supplied to the twin-screw kneading extruder through the screw type side feeder, resin pellets different from the powder, and the like may be supplied together with the powder. In this case, as long as the transport capacity of the screw type side feeder sufficiently exceeds the total amount of the effective volume of the powder and the volume of the resin pellets supplied from the gravimetric feeder to the screw type side feeder, the volume of the resin pellets need not be considered when the transport capacity of the screw type side feeder is set. From the viewpoint of more stably supplying the powder to the twin-screw kneading extruder, it is preferable that the powder and 25 parts by weight or more of the resin pellets based on 100 parts by weight of the powder be supplied from the gravimetric feeder to the twin-screw kneading extruder through the screw type side feeder. It is preferable that the resin pellets supplied from the gravimetric feeder to the twin-screw kneading extruder through the screw type side feeder be 200 parts by weight or less based on 100 parts by weight of the powder. Examples of the resin pellets supplied from the gravimetric feeder to the twin-screw kneading extruder through the screw type side feeder include thermoplastic resin pellets in which the (apparent density)/(true density) is 0.9 or more, and there is no limitation on transition temperature.

In the twin-screw kneading extruder applied to the present invention, the second kneading zone is provided on the downstream side of the position where the powder is supplied through the side feeder, and a transport zone may be provided between the position where the above powder is supplied to the above twin-screw kneading extruder and the above second kneading zone. The resin pressure in the second kneading zone is set at less than 3 MPa to increase the proportions of gas mixed into the twin-screw kneading extruder with powder supply and the volatile components included in the raw materials coming out to the downstream side of the twin-screw kneading extruder, to decrease the amounts of the gas and the volatile components flowing backward to the upstream side. By suitably disposing, on the downstream side in the second kneading zone, such segments as to push back the resin in the upstream direction by the rotation of the screws, and segments having the effect of stemming the resin, a resin pressure of less than 3 MPa can be set. From the viewpoint of sufficiently dispersing the powder supplied from the screw type side feeder, it is preferable that the resin pressure in the second kneading zone be 0.02 MPa or more, and the resin pressure in the second kneading zone is more preferably 0.1 MPa or more. The resin pressure in the second kneading zone is preferably 32 MPa or less. Generally the gap distance from a stirring edge that is the outermost peripheral end face of a segment such as a reverse disk installed on the downstream side of a second kneading zone to a cylinder inner wall (tip clearance) is usually equal to the gap distance from the flight top to the cylinder inner wall, but in the invention of this application, in order to control the resin pressure in the second kneading zone as described above, it is preferable to use, as the gap distance between the kneading disks used in the second kneading zone, 2 times to 3 times the usual gap distance. The usual gap distance changes according to the maker and cylinder diameter of the twin-screw kneading extruder, the properties of the produced product, and the like but is generally about 0.2 to 1.5 mm. There are many cases where the axial thickness of each kneading disk (disk width) is usually about ⅕ D (D is taken as the screw diameter), but in the second kneading zone according to the present invention, it is preferable to set the axial thickness of each kneading disk at ⅖ D or more.

In the twin-screw kneading extruder applied to the present invention, the vent port is provided downstream from the second kneading zone, and the above gas and volatile components are removed out of the system. This venting (that is, removal out of the system) may be a usual release into the air, or venting in which reduced pressure suction is performed. In the twin-screw kneading extruder, a third kneading zone may be further provided downstream of the above vent port. It is preferable that the resin pressure in the third kneading zone be about 1 to 6 MPa.

In the twin-screw kneading extruder, a pressure reduction vent port may be further provided downstream from the third kneading zone. By performing melting and kneading with the twin-screw kneading extruder having such a configuration, kneading can be performed with productivity higher than conventional productivity, and a resin composition in which the dispersibility of components is also good is obtained.

Next, the screw configuration of the twin-screw kneading extruder according to the present invention will be described. For the screw configuration of the first kneading zone, a configuration in which forward disks, orthogonal disks, and reverse disks are included and the resin pressure is rapidly raised to 1 MPa or more so that the resin can be quickly and reliably plasticized in a short section is preferable. Therefore, in the first kneading zone, it is preferable that the thickness of the disk be thin because the purpose can be achieved in a short section. Also a gap distance (tip clearance) as narrow as usual is preferable. The second kneading zone aims to gradually knead the powder into the above-described molten resin while allowing some volatile matter to escape toward the vent port downstream from the second kneading zone, and mainly comprises forward disks, and wide disks are preferable. A gap distance (tip clearance) wider than the usual one is preferable. For the third kneading zone, a screw configuration required for usual dispersion and mixing can be adopted because the melting of the resin and the incorporation of the powder into the molten resin are already achieved to some extent before the second kneading zone. In screws in portions other than the kneading zones described here, that is, the feed zones, the transport zones between the kneading portions and the kneading portions, the pressure rise zone at the tip, and the like, it is preferable to use full flight screws. Usually double-thread full flight screws are used, but when it is desired to increase transport volume, there is also a case where single-thread full flight screws are used.

When a resin composition is produced in this manner, other optional components may be blended according to the purpose. Examples of such optional components include antioxidants, ultraviolet absorbing agents, light stabilizers, heat stabilizers, lubricants, antistatic agents, colorants, conductive agents, dispersing agents, printability-providing agents, organic fillers, flame retardants, flame-retardant aids, foaming agents, processing aids, neutralizing agents, heavy metal deactivators, nucleating agents, antifogging agents, antimicrobial agents, and fungicides.

These additives may be supplied together with the thermoplastic resin from the supply port in the first transport zone of the twin-screw kneading extruder into the twin-screw kneading extruder or may be supplied from a supply port into the twin-screw kneading extruder by providing the supply port in the second transport zone or the third transport zone. The above first transport zone is located between the most upstream supply port and the first kneading zone, the above second transport zone is located between the first kneading zone and the second kneading zone, and the above third transport zone is located between the second kneading zone and the third kneading zone. A fourth transport zone may be further provided downstream of the third kneading zone.

INDUSTRIAL APPLICABILITY

By the present invention, a method that not only allows production with high efficiency without troubles in terms of production such as raw materials being not smoothly supplied into a twin-screw kneading extruder, in the production of a resin composition in which a powder in which the apparent density is low and a thermoplastic resin are melted and kneaded with a twin-screw kneading extruder, but can also satisfy conventionally required levels in the dispersion of the powder and the physical properties of the resin composition can be provided, and the industrial value of the method is great.

EXAMPLES

The present invention will be described in more detail below using Examples, but the present invention is not limited by these.

The measured values of items in the Examples were measured by the following methods.

(1) Dispersed State of Inorganic Filler

The dispersed state of an inorganic filler in a resin composition was evaluated by the number of aggregates seen in a film molded by a T-die film molding machine using obtained resin composition pellets. When the number of aggregates is small, the dispersed state of the inorganic filler is good.

As raw materials, pellets of polypropylene(transition temperature 160° C.), pellets of an ethylene-butene copolymer (transition temperature 38° C.) and pellets of an ethylene-octene copolymer (transition temperature 35° C.) that were rubber pellets, and talc (apparent density 0.6 g/ml) as a powder were used. The apparent density of talc used for the calculation of effective volume was obtained by dropping talc from a height of 2.3 m in order to simulatively reproduce a state in which talc was introduced into a screw type side feeder from a gravimetric feeder, receiving the talc in a graduated cylinder, and measuring the weight per unit volume, and was 0.51 g/ml.

Example 1

As a twin-screw kneading extruder, a corotating intermeshing type twin-screw kneading, extruder having a cylinder diameter of 47 mm was used. The twin-screw kneading extruder has a cylinder and two screws housed in the above cylinder, and the cylinder is divided into a first transport zone, a first kneading zone, a second transport zone, a second kneading zone, a third transport zone, a third kneading zone, and a fourth transport zone from the upstream side. In the cylinder, a supply port was provided in the most upstream portion in the first transport zone, an open vent was provided in the most upstream portion in the third transport zone, and a vacuum vent was provided in the most upstream portion in the fourth transport zone. A twin-screw type side feeder was connected to the second transport zone of the cylinder, and a gravimetric feeder was connected to the screw type side feeder.

In the screws in portions corresponding to the first kneading zone, forward (forward feed direction) disks, orthogonal (neutral) disks, and reverse (backward feed direction) disks were disposed from the upstream side so that the resin pressure in the first kneading zone was from 2 MPa to 8 MPa. For each of the thicknesses of the above forward disk and orthogonal disk, a thickness of 0.2 D (D was the screw diameter) was used, and for the thickness of the reverse disk, a thickness of 0.1 D was used.

In the screws in portions corresponding to the second kneading zone, forward disks were disposed lengthwise from the upstream side and finally reverse disks were disposed so that the resin pressure in the second kneading zone was 0.2 to 3 MPa. For each of the thicknesses of the above forward disk and reverse disk, a thickness of 0.5 D was used. For the gap distance between these disks, 2 times the gap distance between flights was used. An open vent was provided downstream of the reverse disks hi the second kneading zone. In the screws in portions corresponding to the third kneading zone, forward disks, orthogonal disks, and reverse disks were used and disposed so that the resin pressure in the third kneading zone was 1 to 4 MPa, and for the thicknesses of all disks, a thickness of 0.1 D was used.

60 Parts by weight of polypropylene pellets and 20 parts by weight of rubber pellets and additives were supplied from the supply port in the most upstream portion in the first transport zone of the twin-screw kneading extruder into the twin-screw kneading extruder. 20 Parts by weight of talc was supplied to the gravimetric feeder, supplied from the gravimetric feeder to the twin-screw type side feeder, and supplied from the twin-screw type side feeder into the twin-screw kneading extruder. The total amount of the polypropylene pellets and the rubber pellets and the talc supplied into the twin-screw kneading extruder fed was 600 kg/h. The effective volume of the talc supplied from the gravimetric feeder to the twin-screw type side feeder was 247 L/h, and the transport capacity of the screw type side feeder was 601 L/h. The transport capacity of the screw type side feeder was about 2.4 times the volume of the talc supplied from the gravimetric feeder to the screw type side feeder per unit time. By melting and kneading the above raw materials at a number of revolutions of the screws of the twin-screw kneading extruder of 1050 rpm and performing reduced pressure suction from the above vacuum vent, the raw materials were smoothly supplied into the twin-screw kneading extruder, and the production of resin composition pellets containing polypropylene, rubber, additives, and talc was stably possible. The resin pressure in the kneading zones during production was 6.4 MPa in the first kneading zone, 0.4 MPa in the second kneading zone, and 2.0 MPa in the third kneading zone. The dispersed state of talc in a film molded by a T-die film molding machine using the obtained resin composition pellets was good.

Example 2

Operation was performed as in Example 1 except that 40 parts by weight of polypropylene pellets and 20 parts by weight of rubber pellets and additives were supplied from the supply port in the most upstream portion in the first transport zone of the twin-screw kneading extruder into the twin-screw kneading extruder, 20 parts by weight of talc and 20 parts by weight of polypropylene pellets were supplied to the gravimetric feeder, the total amount of the polypropylene pellets and the rubber pellets and the talc supplied into the twin-screw kneading extruder fed was set at 800 kg/h, the transport capacity of the screw type side feeder was set at 801 L/h, and the number of revolutions of the screws of the twin-screw kneading extruder was set at 1200 rpm. The raw materials were smoothly supplied into the twin-screw kneading extruder, and resin composition pellets were stably produced. The resin pressure in the kneading zones during production was 5.8 MPa in the first kneading zone, 0.5 MPa in the second kneading zone, and 2.4 MPa in the third kneading zone. The dispersed state of talc in a film molded using the obtained resin composition pellets was good.

Example 3

Operation was performed as in Example 2 except that the total amount of polypropylene pellets and rubber pellets and talc supplied into the twin-screw kneading extruder fed was set at 900 kg/h, and the number of revolutions of the screws of the twin-screw kneading extruder was set at 1350 rpm. The raw materials were smoothly supplied into the twin-screw kneading extruder, and resin composition pellets were stably produced. The resin pressure in the kneading zones during production was 5.5 MPa in the first kneading zone, 0.4 MPa in the second kneading zone, and 2.4 MPa in the third kneading zone. The dispersed state of talc in a film molded using the obtained resin composition pellets was good.

Comparative Example 1

Operation was performed as in Example 1 except that the transport capacity of the screw type side feeder was set at 400 L/h. The transport capacity of the screw type side feeder was about 1.6 times the volume of talc supplied from the gravimetric feeder to the screw type side feeder per unit time. The talc deposited between the gravimetric feeder and the screw type side feeder and was not smoothly supplied into the twin-screw kneading extruder, and production could not be continued.

Comparative Example 2

Operation was performed as in Example except that in the screws in portions corresponding to the second kneading zone, forward disks were disposed lengthwise from the upstream side and finally reverse disks were disposed lengthwise so that the resin pressure in the second kneading zone was 3 MPa or more. For the above forward disk, that of 0.5 D was used, and for the thickness of the above reverse disk, a thickness of 0.5 D and a thickness of 0.1 D were used in combination. For the gap distance between the above forward disks, 2 times the gap distance between flights was used, and for the gap distance between the above reverse disks, one equal to the gap distance between flights was used. The resin pressure in the kneading zones during production was 5.7 MPa in the first kneading zone, 3.5 MPa in the second kneading zone, and 5.7 MPa in the third kneading zone. After 10 minutes from the start of production, the raw materials were not smoothly supplied into the twin-screw kneading extruder, and the production could not be continued.

Comparative Example 3

The same twin-screw kneading extruder as Example 1 was used, and in the cylinder of the twin-screw kneading extruder, the first kneading zone in Comparative Example 1 was provided on the slightly downstream side from the second kneading zone in Example 1, the second kneading zone in Comparative Example 1 was provided at the same position as the third kneading zone in Example 1, an open vent was provided between the first kneading zone and the second, kneading zone in Comparative Example 1, and a vacuum vent was provided downstream from the second kneading zone in Comparative Example 1. The zone upstream from the first kneading zone in Comparative Example 1 was set as the first transport zone in Comparative Example 1.

In the screws in portions corresponding to the first kneading zone in Comparative Example 1, forward disks were disposed lengthwise from the upstream side and finally reverse disks were disposed so that the resin pressure in the first kneading zone was 0.2 to 3 MPa. In the screws in portions corresponding to the second kneading zone in Comparative Example 1, forward disks, orthogonal disks, and reverse disks were used and disposed so that the resin pressure in the second kneading zone was 1 to 4 MPa.

When conditions in which 60 parts by weight of polypropylene pellets and 20 parts by weight of rubber pellets and additives and 20 parts by weight of talc were collectively supplied from the supply port in the most upstream portion in the first transport zone of the twin-screw kneading extruder into the twin-screw kneading extruder, the raw materials were smoothly supplied into the twin-screw kneading extruder, and it was possible to stably produce resin composition pellets containing polypropylene, rubber, additives, and talc were adjusted, they were the conditions of a total amount of the polypropylene pellets and the rubber pellets and the talc fed of 450 kg/h and a number of revolutions of the screws of the twin-screw kneading extruder of 1320 rpm. The resin pressure in the kneading zones during production was 0.9 MPa in the first kneading zone and 1.8 MPa in the second kneading zone. The dispersed state of talc in a film molded using the obtained resin composition pellets was good. When the number of revolutions of the screws of the twin-screw kneading extruder was decreased to 1000 rpm, the raw materials were not smoothly supplied into the twin-screw kneading extruder, and the production could not be continued.

Comparative Example 4

A screw configuration and a cylinder configuration similar to those in Comparative Example 1 were set, and a twin-screw type side feeder was connected to the first transport zone of the cylinder of the twin-screw kneading extruder in Comparative Example 1, and a gravimetric feeder was connected to the screw type side feeder. 60 Parts by weight of polypropylene pellets and 20 parts by weight of rubber pellets and additives were supplied from the supply port in the most upstream portion of the twin-screw kneading extruder. 20 Parts by weight of talc was supplied to the gravimetric feeder and supplied from the twin-screw type side feeder into the twin-screw kneading extruder. The transportation capacity of the screw type side feeder was 801 L/h. When conditions in which the raw materials were smoothly supplied into the twin-screw kneading extruder, and it was possible to stably produce resin composition pellets containing polypropylene, rubber, additives, and talc were adjusted, they were the conditions of a total amount of the polypropylene pellets and the rubber pellets and the talc fed of 500 kg/h and a number of revolutions of the screws of the twin-screw kneading extruder of 1320 rpm. The resin pressure in the kneading zones during production was 0.8 MPa in the first kneading zone and 1.7 MPa in the second kneading zone. The dispersed state of talc in a film molded using the obtained resin composition pellets was good. When the number of revolutions of the screws of the twin-screw kneading extruder was decreased to 1000 rpm, the raw materials were nut smoothly supplied into the twin-screw kneading extruder, and the production could not be continued. Even if the total amount of the polypropylene pellets and the rubber pellets and the talc fed was increased to 550 kg/h with the number of revolutions of the screws allowed to remain at 1320 rpm, the raw materials were not smoothly supplied into the twin-screw kneading extruder, and the production could not be continued.

It can be said that when melting and kneading are performed with a twin-screw kneading extruder, to produce a resin composition, it is preferable that melting and kneading can be stably performed at an appropriate number of revolutions of the screws that does not apply excessive energy to the resin composition, and the productivity is deemed higher when larger amounts of raw materials can be stably melted and kneaded at a smaller number of revolutions.

In Comparative Example 3 and Comparative Example 4, a resin composition cannot be produced unless the total amount of the raw materials fed is made smaller than in Example 1 and a number of revolutions of the screws larger than in Example 1 is set, and therefore the productivity is low, and the production stability is also poor. In addition, in Comparative Example 3 and Comparative Example 4, when the number of revolutions of the screws of the twin-screw kneading extruder is set at the same level as the number of revolutions of the screws in Example 1, a resin composition cannot be produced.

The invention claimed is:

1. A method for producing a resin composition, comprising melting and kneading a thermoplastic resin having a transition temperature of less than 200° C. and a powder with a twin-screw kneading extruder, wherein
    the powder is one or more powders selected from the group consisting of an inorganic filler having an apparent density of 0.1 to 1.5 g/ml and a thermoplastic resin powder having an apparent density of 0.1 to 1.0 g/ml and a transition temperature of 200° C. or more,
    the twin-screw kneading extruder comprises a supply port, a first kneading zone, a screw side feeder to which a gravimetric feeder is connected, a second kneading zone, and a vent port in order from an upstream side,
    the thermoplastic resin having a transition temperature of less than 200° C. is supplied from the supply port to the twin-screw kneading extruder,
    the powder is supplied from the gravimetric feeder to the twin-screw kneading extruder through the screw side feeder,
    a transport capacity of the screw side feeder is 2 times or more an effective volume of the powder supplied from the gravimetric feeder to the screw side feeder per unit time, melting and kneading are performed under conditions in which resin pressure in the first kneading zone is 1 MPa or more, and resin pressure in the second kneading zone is less than 3 MPa, and gas is removed from the vent port.

2. The method for producing a resin composition according to claim 1, wherein the resin pressure in the first kneading zone is 2 MPa or more.

3. The method for producing a resin composition according to claim 1, wherein the twin-screw kneading extruder has, further downstream of the vent port, a third kneading zone and a pressure reduction vent port downstream from the third kneading zone.

4. The method for producing a resin composition according to claim 1, wherein the powder and 25 parts by weight or more of resin pellets based on 100 parts by weight of the powder are supplied from the gravimetric feeder to the twin-screw kneading extruder through the screw side feeder.

5. The method for producing a resin composition according to claim 1, wherein the powder is one or more powders selected from the group consisting of talc, kaolinite, and clay, and the thermoplastic resin having a transition temperature of less than 200° C. is a polyolefin-based resin.

* * * * *